(12) United States Patent
Kim

(10) Patent No.: US 9,318,906 B2
(45) Date of Patent: Apr. 19, 2016

(54) UNIVERSAL DOCK FOR PORTABLE PHONE

(71) Applicant: Samsung Electronics Co., Ltd., Gyeonggi-do (KR)

(72) Inventor: Jong-Hae Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 334 days.

(21) Appl. No.: 13/771,954

(22) Filed: Feb. 20, 2013

(65) Prior Publication Data

US 2013/0241470 A1    Sep. 19, 2013

(30) Foreign Application Priority Data

Mar. 13, 2012    (KR) .................. 10-2012-0025357

(51) Int. Cl.
*H02J 7/00* (2006.01)
*H04M 1/04* (2006.01)

(52) U.S. Cl.
CPC .............. *H02J 7/0044* (2013.01); *H04M 1/04* (2013.01)

(58) Field of Classification Search
CPC ....................................................... G02H 7/00
USPC ........................................................... 320/107
See application file for complete search history.

(56) References Cited

U.S. PATENT DOCUMENTS

| | | | |
|---|---|---|---|
| 5,828,966 A * | 10/1998 | Davis et al. | 455/573 |
| 8,054,042 B2 | 11/2011 | Griffin, Jr. et al. | |
| 2003/0202013 A1 | 10/2003 | Wilkinson et al. | |
| 2010/0062615 A1 * | 3/2010 | Prest | 439/38 |
| 2010/0317413 A1 * | 12/2010 | Tan | 455/573 |
| 2011/0159923 A1 * | 6/2011 | Raffle et al. | 455/557 |
| 2011/0164375 A1 * | 7/2011 | Hayashida et al. | 361/679.41 |
| 2012/0005495 A1 * | 1/2012 | Matsuoka et al. | 713/300 |

FOREIGN PATENT DOCUMENTS

| | | |
|---|---|---|
| EP | 1 835 706 A2 | 9/2007 |
| KR | 10-2002-0085363 A | 11/2002 |
| KR | 10-2005-0079364 A | 8/2005 |
| KR | 10-2009-0081142 A | 7/2009 |

* cited by examiner

*Primary Examiner* — Mohammed Alam
(74) *Attorney, Agent, or Firm* — Cha & Reiter, LLC

(57) ABSTRACT

The present invention discloses a universal dock having a universal cradle for cradling a portable terminal having various sizes and types or accessory thereon, and a connector dummy receiving a connector for electrically connecting to the portable terminal and moving upward and downward on the universal cradle.

9 Claims, 10 Drawing Sheets

UNIVERSAL DOCK FOR PORTABLE PHONE

CLAIM OF PRIORITY

This application claims the benefit under 35 U.S.C. 119(a) of a Korean Patent Application filed in the Korean Intellectual Property Office on Mar. 13, 2012 and assigned Ser. No. 10-2012-0025357, the entire disclosure of which is incorporated herein by reference.

BACKGROUND OF THE INVENTION

1. Field of the Invention

The present invention relates to a portable phone, and particularly to a universal dock for a portable phone capable of charging and/or cradling various sizes or types of the portable phone.

2. Description of the Related Art

Generally, a portable phone, such as a cellular phone, a Personal Digital Assistant (PDA), a smart phone, a tablet Personal Computer (PC) and etc., uses a cradle for charging its power. Although the charging cradle may cradle the portable phone in a horizontal state or a vertical state, it is common to cradle the portable phone in a slanted state. When a charging cradle enables the portable phone to be cradled in a slanted position, it allows an easier viewing of a displayed screen while being recharged.

The portable phone is typically configured with a built-in type or a detachable type battery.

Further, the charging cradle may be configured in various types having: a cradle space dedicated to the portable phone to cradle the same; and a connector (a connecting terminal) for connecting to a charging terminal of the portable phone or to a charging terminal of a separate auxiliary battery pack.

FIGS. 1 and 2 show a portable phone 400 of a general bar-type. As shown in FIG. 1, the smart phone has a touch screen 401 disposed on its top surface and a connecting portion 402 disposed on its front surface.

As shown in FIG. 2, it is common for the portable phone 400 to include an exterior case 410 for the purpose of shock-absorbing at the time of falling (i.e., bumper function) or as an esthetic accessory. The exterior case 410 may be made of high-elastic material, such as rubber or silicon material and have various colors. Also, the exterior case is configured to enclose the entire part of the portable phone except for the top surface (the view area), the connector part, and the key-located part. Hence, if the portable terminal is protected by the exterior case, the dedicated charging cradle of the portable phone requires that the exterior case must be removed from the portable phone so as to cradle and charge the portable phone, which causes inconvenience.

However, the conventional charging cradle is specifically designed for a particular phone, and thus it is uneconomical for the user to replace the portable phone when the charging cradle is lost or damaged. Also, it is uneconomical to purchase another charging cradle each time a new portable phone is issued.

Moreover, as different charging cradle is needed for each manufacturer and each different model, the manufacture has to produce different charging cradle dedicated to each portable phone which in turn causes an increase in the production cost.

Furthermore, the conventional charging cradle of the portable phone has the disadvantage in that the location of the connector for charging (i.e., the location of the charging connector) is restricted.

Lastly, the conventional dedicated charging cradle of the portable phone further has drawbacks in that an exposed connector cannot be protected from external environment. If the connector is exposed to the external environment all the time, the poor connection may occur over time.

SUMMARY OF THE INVENTION

Accordingly, the present invention is to provide a universal dock that allows a user to make an easy connection and a slanted cradling without any restriction on an overall size of a portable phone (length, width and thickness) or type (bar type, sliding type, folder type etc.).

Also, the present invention is to provide a universal dock that allows a user to make an easy connection and a slanted cradling, while the exterior case encloses the portable phone to protect from exterior.

Also, the present invention is to provide an economical universal dock that allows a manufacturer to save production cost.

Also, the present invention is to provide a universal dock having a universal cradle that may protect a connector against external environment.

Also, the present invention is to provide a universal dock that may provide an audible effect while the universal cradle rotates.

According to one embodiment, the present invention provides a universal dock for a portable phone comprising: a universal cradle capable of cradling a portable phone of various sizes and types or a portable phone including an accessory; and, a connector dummy configured to receive a connector for being electrically coupled to the portable phone and to move upward and downward on the universal cradle.

According to another embodiment, the present invention provides a universal dock for a portable phone comprising: a desktop-type base; a pair of connecting arms to extend in a slanted direction on the base; a support coupled between the connecting arms and supporting a cradled state of the portable phone which is cradled in the cradle and has various types, sizes or a accessory; a connector base which is movably installed at a front area of the base; a connector fixed on the connector base; a housing which changes an exposure degree of the connector by moving upward and downward while being coupled to the connector base and which is rotatable along with the connector base while being received in the base; and elastic pieces installed to the connector base and returning the housing to an initial position.

According to yet another embodiment, the present invention provides a universal dock for a portable phone comprising: a main body; and a universal cradle rotatably coupled to the main body by means of a hinge unit, wherein the universal cradle is disposed on approximate the same plane as an upper surface of the main body when it is in a closed sate on the main body, whereas the universal cradle protrudes from the upper surface of the main body when it is in an open state on the main body, so that the universal cradle can cradle the portable phone which has various sizes and types or an accessory.

According to yet another embodiment, the present invention provides a universal dock for a portable phone comprising: a desktop-type body; a rotatable universal cradle including a cradle body capable of cradling a portable phone having various sizes and types or accessory, wherein the cradle body is disposed on approximate the same plane as an upper surface of the desktop-type body in a first position and wherein the cradle body protrudes from the upper surface of the desktop-type body in a second position; and a connector dummy capable of moving upward and downward or rotating forward and rearward on the universal cradle.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIGS. 4A to 4C are perspective view showing operations of the universal dock according to the first embodiment of the present invention, wherein FIG. 4A shows that a connector dummy of the universal dock protrudes from a upper surface of a base, wherein FIG. 4B shows that the connector dummy of the universal dock is retracted into the upper surface of the base, wherein FIG. 4C shows that the connector dummy of the universal dock rotates on the upper surface of the base;

FIGS. 8 to 11 are perspective views of the universal dock according to a second embodiment of the present invention, wherein FIG. 8 shows a state of a universal cradle being closed, wherein FIG. 9 shows a state of the universal cradle being open, wherein FIG. 10 shows a state of the housing moving downward and wherein FIG. 11 shows a state of a connector dummy being rotated;

DETAILED DESCRIPTION OF EXEMPLARY EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 3:
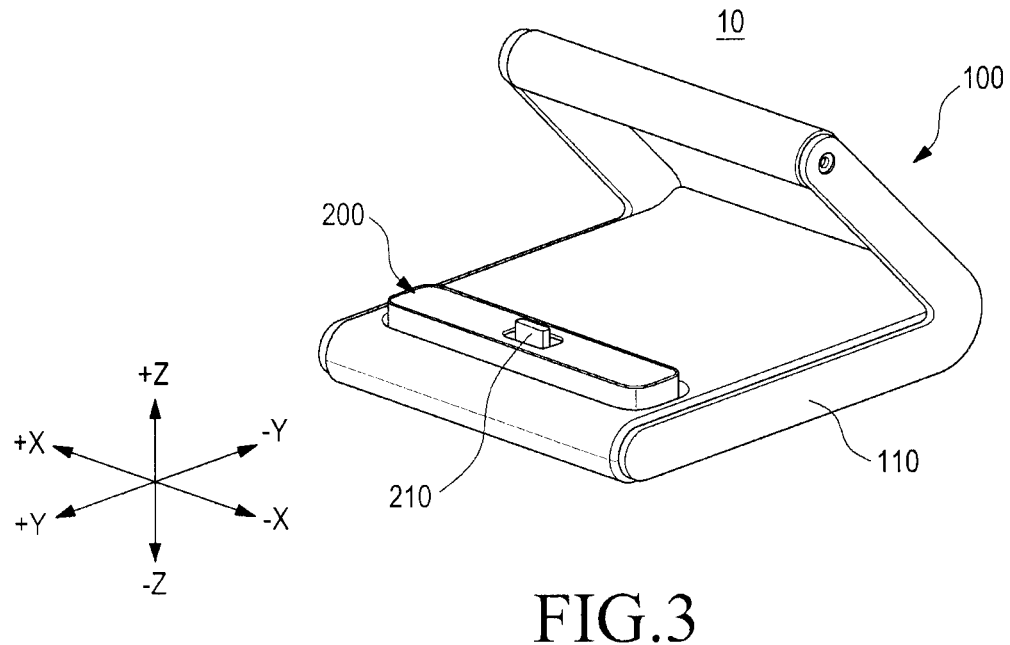
FIG. 3 is a perspective view of a universal dock according to a first embodiment of the present invention.

Referring to FIG. 3, the universal dock 10 comprises: the universal cradle 100 in which the portable phone of various sizes or types is cradled; and a connector dummy 200 to which the portable phone is electrically connected. FIG. 3 also shows a Cartesian coordinates with X axis, Y axis and Z axis for describing the present invention, wherein X axis represents a left-right (widthwise) direction of a dock, wherein Y axis represents a forward-rearward (lengthwise) direction of the dock and wherein Z axis represents an upward-downward direction. Also, +Y axis represents a forward direction of the dock; −Y axis represents the rearward direction; +Z axis represents an upward direction of the dock; and −Z axis represents a downward of the dock.

As shown in FIG. 3, the universal dock 10 of the present invention is a charging device that can be also used as a cradle for a portable phone having various sizes, or types or accessories used to enclose the phone. That is, the portable phone of various sizes means that the width, the length and the thickness of the portable phone may vary. Thus, the portable phone can be cradled in the universal cradle 100 at a certain angle regardless of the width/the length/the thickness of the portable phone. The various types of the portable phone may comprise a cellular phone, a PDA, a smart phone, a tablet PC, an E-book, etc., and may be a bar-type, a sliding-type or a folder-type.

FIG. 3 shows a connector 210 of the connector dummy 200 in an exposed state. The connect 210 is arranged to be exposed to the exterior all the time. Also, the connector dummy 200 is maintained to protrude from an upper face of a base 110 with a predetermined height.

Figure 4A:
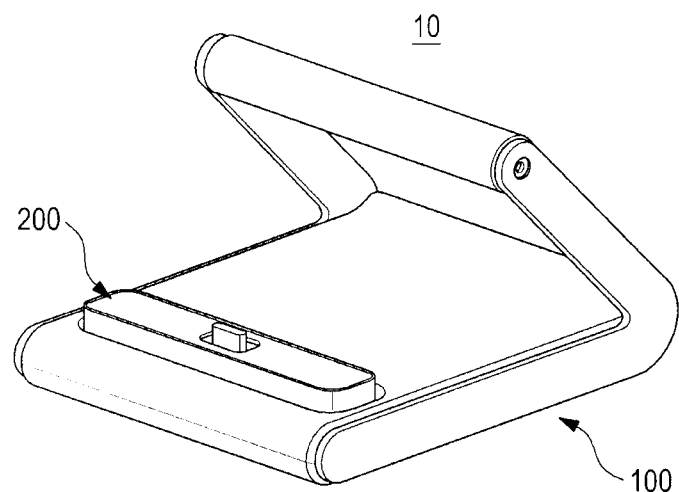
Figure 4B:
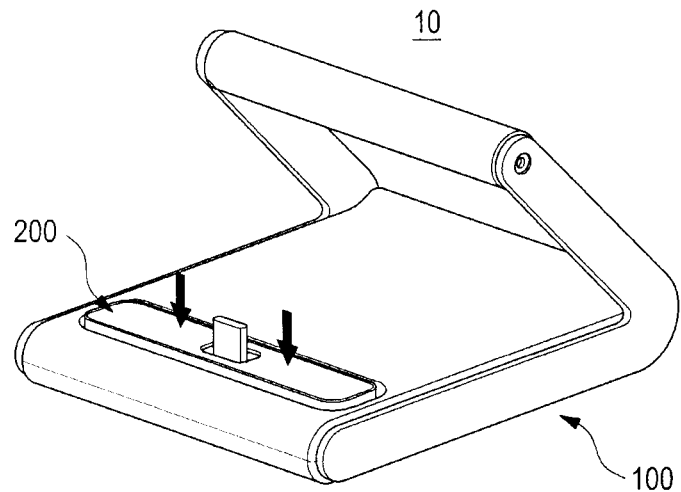
Figure 4C:
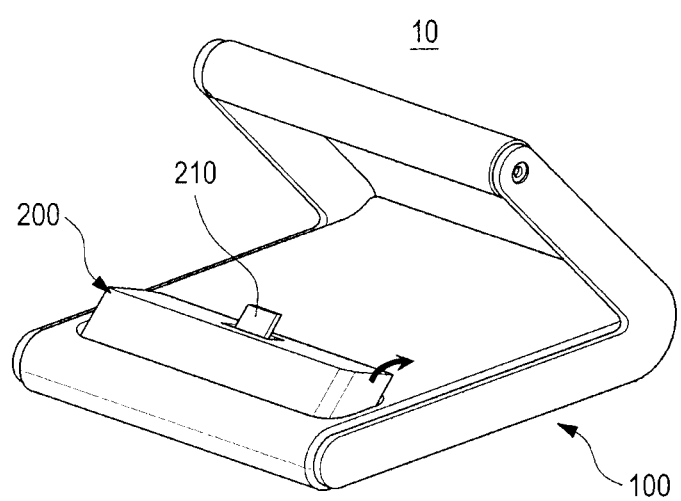

Referring to FIGS. 4A to 4C, the universal cradle 100 maintains the portable phone at a certain angle, defining an upright state or a slanted state of the portable phone. Also, the connector dummy 200, which is a medium enabling the electric connection of the portable phone, is movably installed to a predetermined area of the universal cradle 100. The movement of the connector dummy 200 includes an up-down movement and/or a rotational movement.

Figure 1:
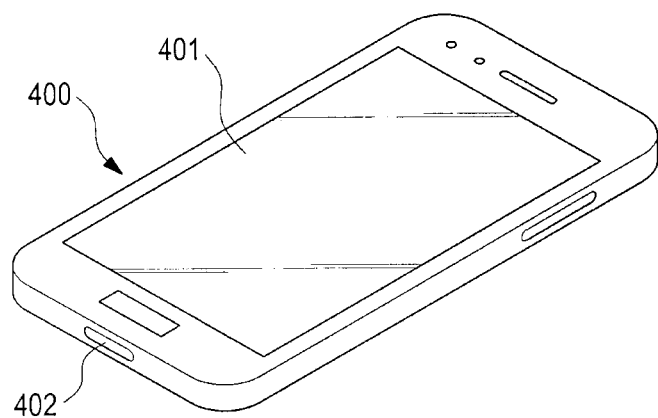
FIG. 1 is a perspective view of a conventional portable phone.
Figure 2:
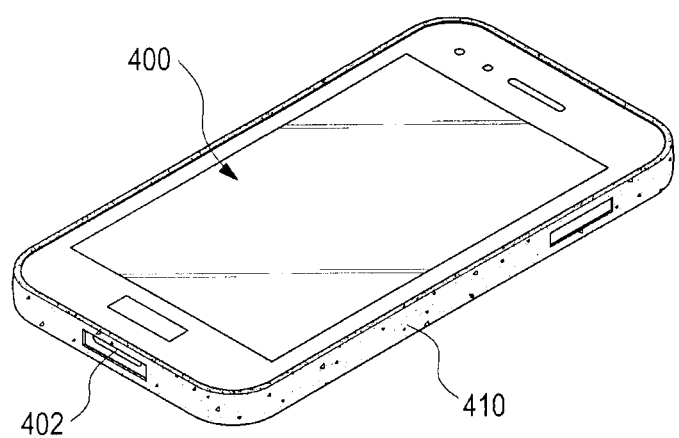
FIG. 2 is a perspective view of the convention portable phone having an exterior case.

More specifically, FIG. 4A shows the connector dummy 200 for connecting to the portable phone, wherein the portable phone does not have the exterior case (410; FIG. 2). FIG. 4B shows the connector dummy 200 for connecting to the portable phone, wherein the potable phone has the exterior case and wherein a housing surrounding the connector 210 is retracted as described in details with reference to FIG. 5. The connector may have a degree of exposure changed depending on the retraction or the protrusion of the housing. FIG. 4C shows a state of the connector dummy 200, wherein the portable phone connected to the connector 210 is rotated to be supported by a support as described in details with reference to FIG. 5.

Hereinafter, a specific configuration of the universal dock 10 will be described in detail with reference to FIG. 5.

Figure 5:
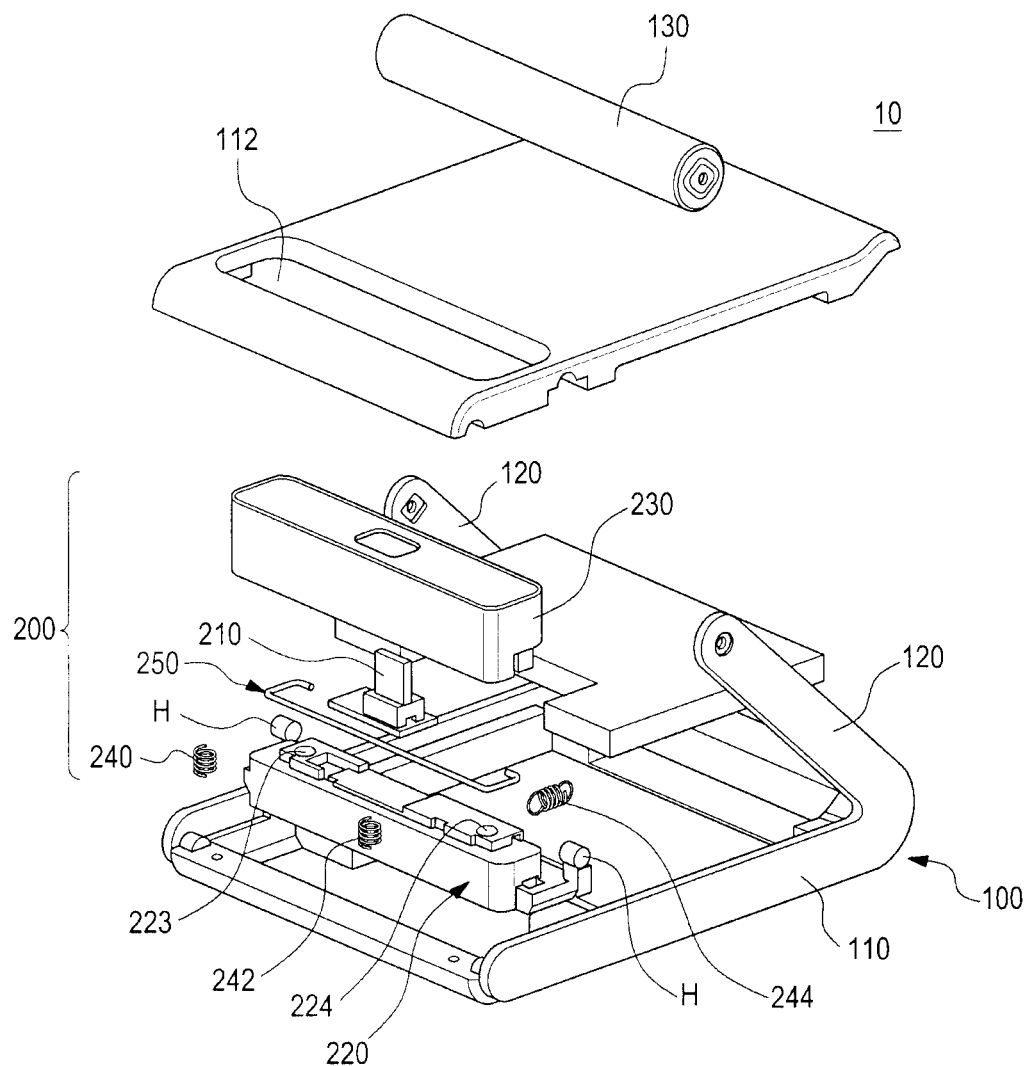
FIG. 5 is an exploded perspective view of the universal dock according to the first embodiment of the present invention.

Referring to FIG. 5, the connector dummy 200 comprises a connector base 220, the housing 230, and the connector 210. The connector base 200 is disposed in a depressed opening (a recess; 112) formed at a front area of the base 110 of a body and is rotatably installed by means of a hinge unit H. The hinge unit H is provided at either side of the connector base 200 to be coupled to a corresponding side wall of the base 110. The hinge unit H is formed to have a boss shape. The housing 230 is coupled to the connector base 220, so that it moves upward (+Z axis) or downward (−Z axis) depending on whether the connector base 220 is pushed.

Figure 6:
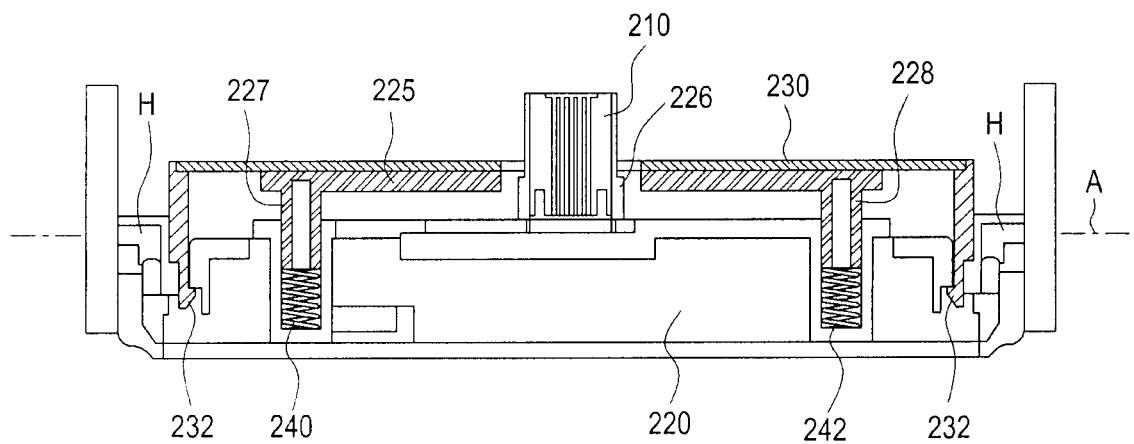
FIG. 6 is a cross-sectional view showing main part of the universal dock according to the first embodiment of the present invention.

As shown in FIGS. 5 and 6, one or more or a pair of elastic pieces 240, 242 are provided between the connector base 200 and the housing 230 to thereby support the upward and downward movement of the housing 230. Specifically, FIG. 4A corresponds to a state when an external force does not exert on the housing, whereas FIG. 4B corresponds to a state when the external force exerts thereon. The elastic pieces provide the force moving toward an initial location of the housing. Cylindrical recesses 223, 224 are provided on the connector base 200, respectively, to thereby allow each of the elastic pieces 240, 242 to be installed in the vertical direction.

The universal cradle 100 comprises a base 110, a pair of connecting arms 120 and a support 130. The base 110 lies on a table and is provided with an opening 112 for receiving a connector dummy 200 in a front area. Each of the connecting arms 120 linearly extends in an inclined direction from a rear end of the base 110. The inclined direction is directed toward the connector dummy 200. The support 130 is connected between the connecting arms 120 to thereby maintain the portable phone cradled in a slanted state.

As shown in FIG. 5, the universal dock 10 further comprises a balancing member 250 for balancing right-left sides of the housing 230 in up-down movement thereof due to the pressing of the portable phone, while performing the connection of the connector 210 to the portable phone.

The balancing member 250 is disposed between the connector base 220 and the housing 230, and particularly is arranged to extend in a longitudinal direction (right and left direction; X axis) of the housing 230 or the connector base 220. The balancing member 250 is disposed between the housing 230 and the connector base 220 to thereby provide the longitudinal stiffness in general. Accordingly, even if the housing 230 is pressed in a biased manner, the housing 230 may move upward or downward in a balanced way to a certain degree by means of the balancing member 250. The balancing member 250 is manufactured by bending a metallic rod many times. The balancing member 250 is arranged to be in parallel to the rotational axis, which is provided by the hinge unit. The reference numeral '244' indicates an elastic member that returns the connector dummy 200 to an initial position.

Figure 7:
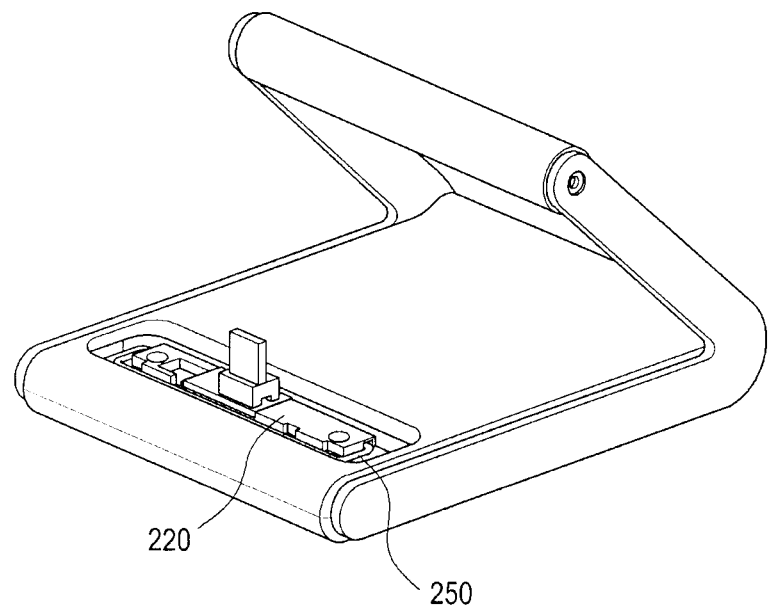
FIG. 7 is a perspective view of the universal dock without a housing according to the first embodiment of the present invention.

The balancing member 250 has a symmetrical shape and is symmetrically disposed on the connector base 220 in right-left direction. The balancing member 250 is bent twice in a perpendicular direction to make the both ends adjacent to each other. The shape of the balancing member 250 is effective for balancing the right-left sides of the housing while the housing 230 moves upward and downward. FIG. 7 shows that the balancing member 250 is installed to the connector dummy 220.

Referring to FIG. 6, when the housing 230 is pressed downward in a vertical direction, the connector support plate 225 is included so as to be supported by the elastic pieces 240, 242. The connector support plate 225 is formed with an opening at its center so as to allow the connecter to pass there-through and is formed with a pair of cylindrical members 227, 228 at its bottom. The cylindrical members 227, 228 extend downward to be inserted into a pair of openings formed in the connector base 220, so that they contact the elastic pieces 240, 242. The elastic pieces 240, 242 provide the force pushing the housing 230 upward all the time. FIG. 6 shows that the housing 230 is pressed to thereby compress the elastic pieces 240, 242. Also, the reference character 'A' indicates a hinge axis, which is provided by the hinge unit H of the connector dummy 220.

Also, the housing 230 may move downward by means of the connector base 220, while it is coupled to the connector base 220 by hooks 232. As a result, the housing 230 is capable of rotating due to the connector base 220 and the housing 230 may move upward and downward on the connector base 220.

Now, a universal dock 30 according to a second embodiment of the present invention will be described with reference to FIGS. 8 to 15.

Figure 8:
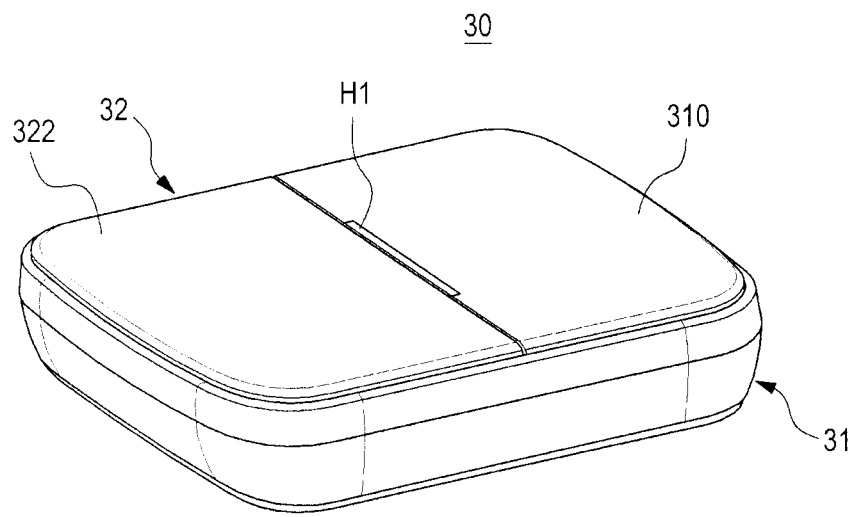
Figure 9:
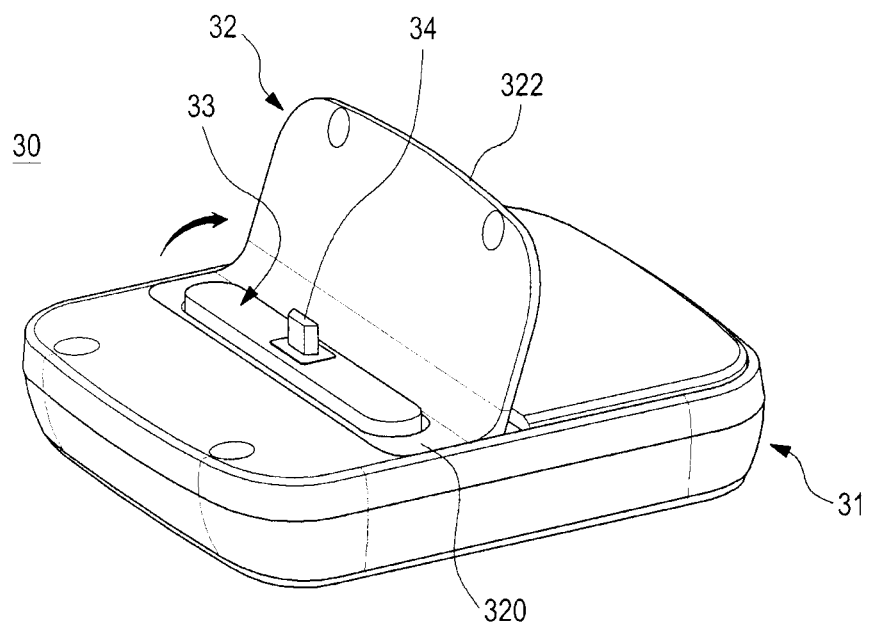

Referring to FIGS. 8 and 9, the universal dock 30 comprises a main body 31, a universal cradle 32, and a connector 34. The main body 31 is a desktop type, and it comprises the universal cradle 32 and the connector 34. The universal connector 32 is rotatably installed to the main body 31 by means of the hinge unit H1. Also, the universal cradle 32 is rotatably installed to the main body 31 to thereby close and open approximately a half of an upper face 310 of the main body 31.

FIG. 8 shows that the universal cradle 32 closes the main body 31, whereas FIG. 9 shows that the universal cradle 32 completely opens the main body 31. When the universal cradle 32 closes the main body 31, it is arranged to be flush with the upper surface 310 of the main body. When the universal cradle 32 opens the main body 31, it is arranged to protrude upward or slanted-upward from the upper surface 310 of the main body. That is, the universal cradle 32 serves to protect the connector dummy 33 and the connecter 34 as described below in a closed state, whereas the universal cradle 32 serves to cradle the portable phone in an open state.

Referring to FIG. 9, the universal cradle 32 provides a cradle capable of cradling various sizes of the portable phone, various types of the portable phone or the portable phone provided with an accessory, such as an exterior case.

Figure 10:
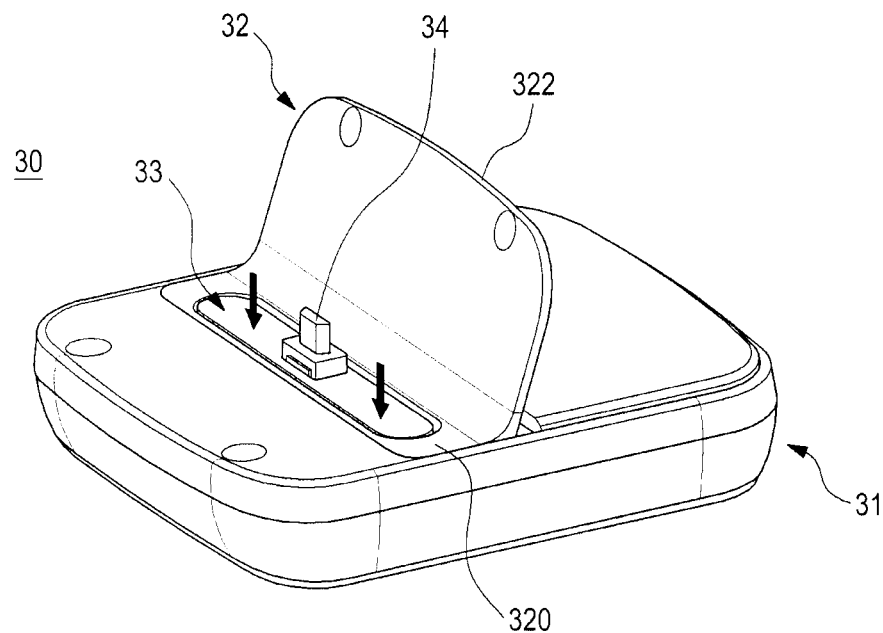
Figure 11:
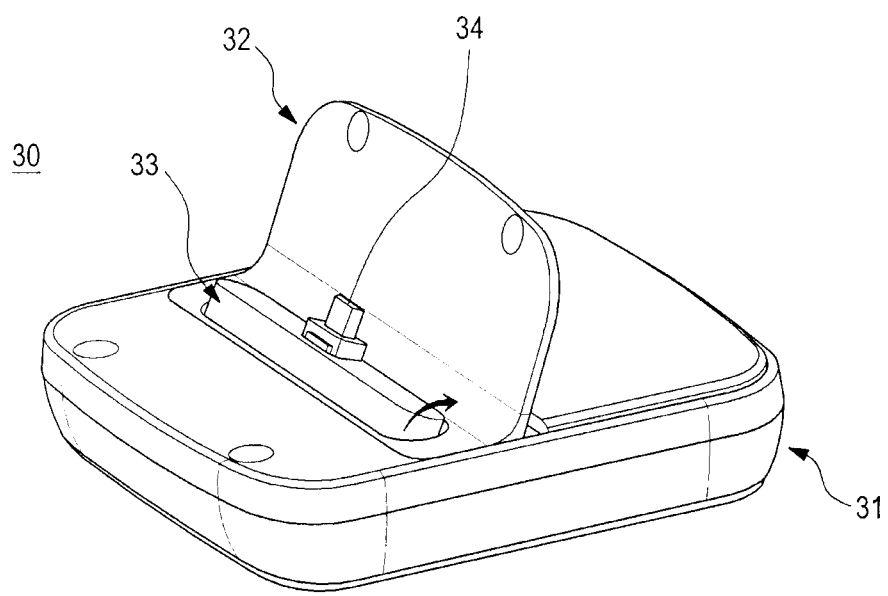

As shown in FIGS. 9 to 11, the universal cradle 32 receives the connector 34 for electrically connecting to the portable phone and a connector dummy 33. Accordingly, when the universal cradle 32 is closed, the connector 34 and the connector dummy 33 are concealed within the body 31 and when the universal cradle 32 is open, they are exposed to the exterior.

In addition, the connector dummy 33 is configured to move upward and downward or to rotate with respect to a base 320. To this end, FIG. 9 shows the connector dummy 33 in a normal state; FIG. 10 shows the connector dummy 33 in a pressed state; and FIG. 11 shows the connector dummy 33 in a rotated state. The rotational axis of the connector dummy 33 is parallel to the rotational axis of the universal cradle 32.

The universal cradle 32 comprises the base 320 and a cradle body 322. The base 320 has the connector dummy 33 and the connector 34 disposed thereon, and the cradle body 322 supports the portable phone (not shown) in a slanted state. FIGS. 9 to 11 show only the housing of the connector dummy 33.

Specific configuration of the universal dock 30 will be described later with reference to FIGS. 12 and 13. As shown, the connector dummy 33 comprises a connector base 330, a housing 332 and a support 334. The connector base 330 is received in a depressed opening (a recess; 331) of the support 320 of the universal cradle 32 along with the housing 332, so that it is rotatably mounted by means of hinge units H2. The hinge units H2 are formed at either side of the connector base 330, so that they are coupled to inner walls of the body 31. Each of the hinge units H2 has a boss shape. The housing 332 is connected to the connector base 330, so that the housing 332 moves upward and downward depending on whether or not the connector base 330 is pressed (whether or not there is an external force, such as a weight of the portable phone).

One or more elastic pieces 333 are included between the connector base 330 and the housing 332 to thereby support the upward and downward movement of the housing 332. Thus, FIG. 9 corresponds to a state when an external force does not exert on the housing 332, whereas FIG. 10 corresponds to a state when the external force exerts thereon. The elastic pieces 333 provide the force for moving the housing 332 to an initial position (FIG. 9). Cylindrical recesses 330a are respectively formed on the connector base 330 to thereby make the elastic pieces 333 to be inserted uprightly therein in a vertical direction.

The universal dock 30 further comprises a balancing member 335 for balancing right-left sides of the housing 332 in the upward and downward movement thereof due to the pressing of the portable phone, while performing the connection of the connector 34 to the portable phone.

The balancing member 335 is disposed between the connector base 330 and the housing 332, and particularly is arranged to extend in a longitudinal direction of the housing 332 or the connector base 330. The balancing member 335 is disposed between the housing 332 and the connector base 330 to thereby provide the longitudinal stiffness in general. Accordingly, even if the housing 332 is pressed in a biased manner, the housing 332 may move upward or downward in a balanced way to a certain degree by means of the balancing member 335. The balancing member 335 is manufactured by bending a metallic rod many times. The balancing member 335 is arranged to be in parallel to the rotational axis, which is provided by the hinge unit H2. The balancing member 335 has a symmetrical shape and is symmetrically disposed on the connector base 330 in right-left direction. The balancing member 335 is perpendicularly bent twice to make the both ends adjacent to each other. The shape of the balancing member 335 is effective for balancing the right-left sides of the housing, while the housing 332 moves upward and downward.

When the housing 332 is pressed downward in a vertical direction, the housing 332 includes a pair of cylindrical members 332a at its bottom so as to be supported by the elastic pieces 333. The cylindrical members 332a extend downward to be inserted into a pair of openings 330a, which are formed in the connector base 330, so that they are in contact with the elastic pieces 333. The elastic pieces 333 provide the force pushing the housing 332 upward all the time.

Also, the housing 332 may move downward by means of the connector base 330, while it is coupled to the connector base 330 by hooks 330b.

As a result, the housing 332 is capable of rotating due to the connector base 330 and the housing 330 may move upward and downward on the connector base 330.

Figure 12:
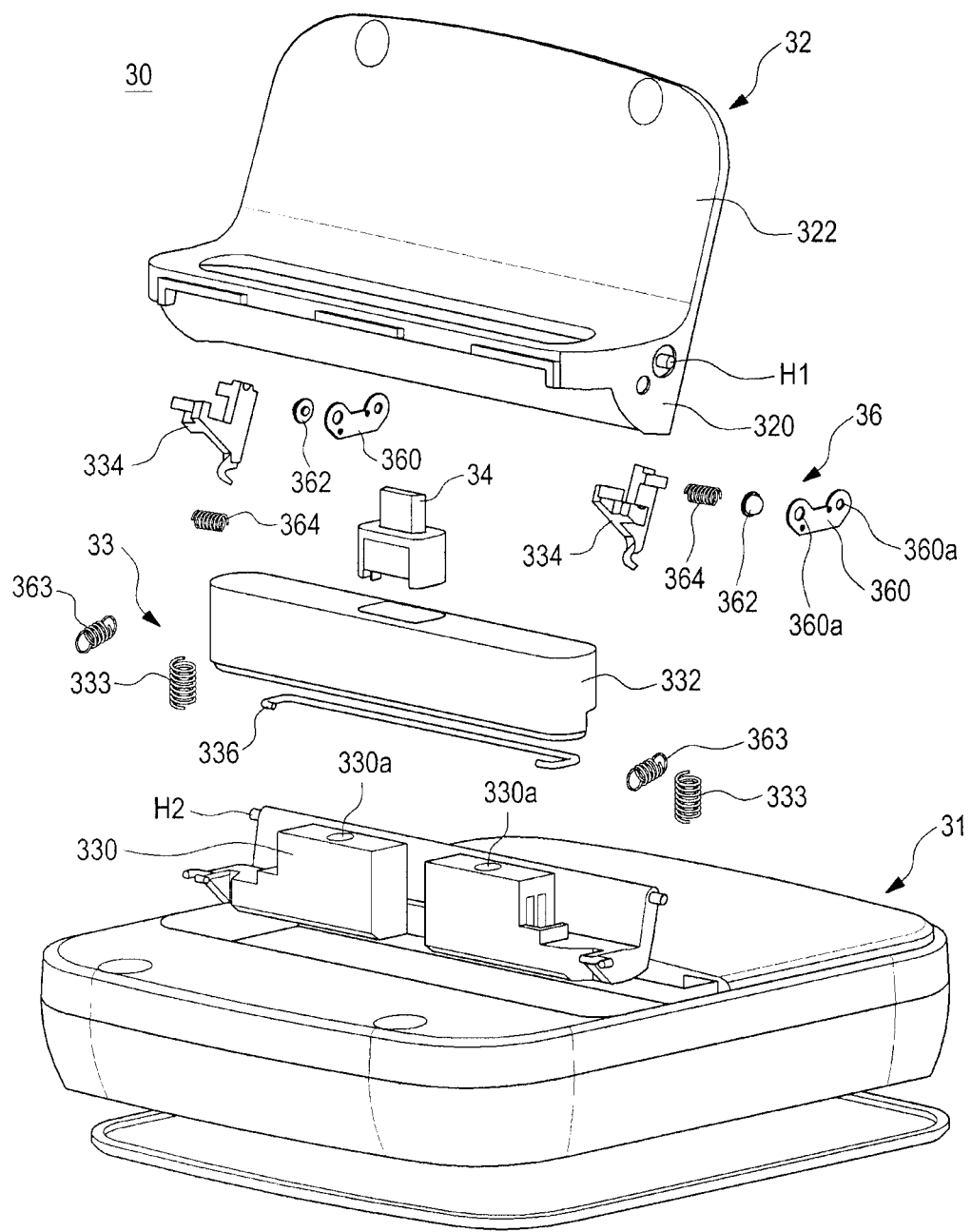
FIG. 12 is an exploded perspective view of the universal dock according to the second embodiment of the present invention.
Figure 13:
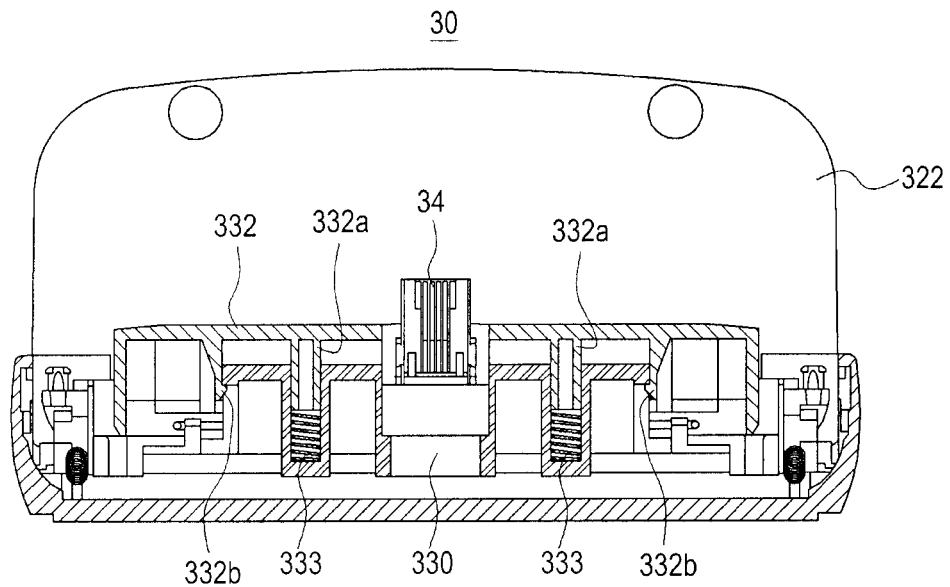
FIG. 13 is a cross-sectional view of the universal dock in an assembled state according to the second embodiment of the present invention.
Figure 14:
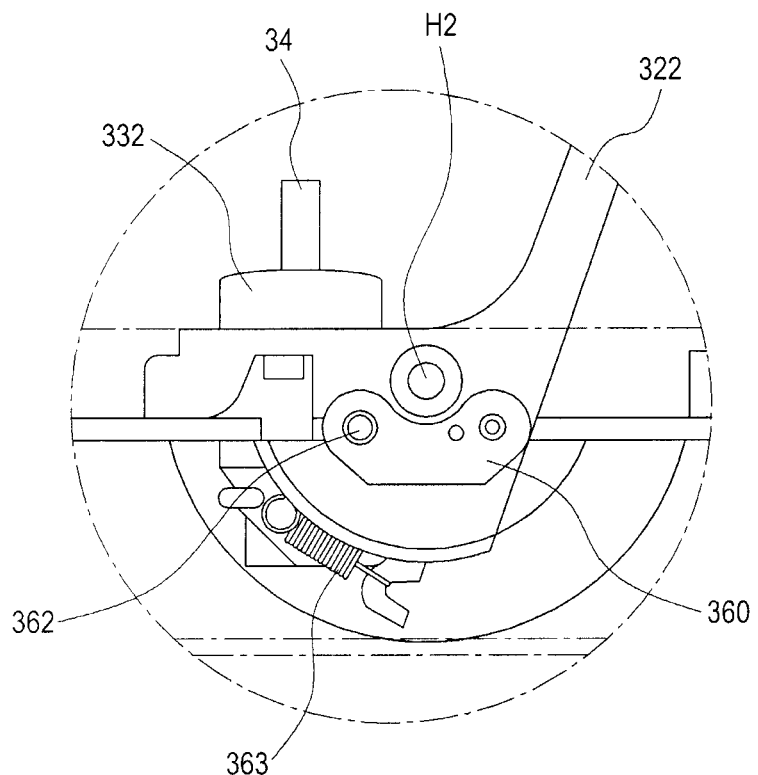
FIG. 14 is a side view of a part of the universal dock according to the second embodiment of the present invention.

As shown in FIGS. 12 to 14, the universal dock 30 further comprises a maintenance mechanism 36 for maintaining the universal cradle 32 in a closed state and an open state. The maintenance mechanism 36 comprises brackets 360, balls 362, supports 334 and elastic members 364. The brackets 360 are made of SUS material and, they are provided in a pair and mounted to the inner wall of the body 31. Each bracket 360 is formed with holes 360a at both ends to thereby allow the ball 262 to be inserted therein or pulled out thereof.

The balls 362 and the elastic members 364 are made in a pair and are supported by a pair of the supports 334. By means of the coupling force between the balls 362 and the holes 360a, the universal cradle 32 may maintain a closed position and an open position. The ball 362 may be pulled out of a selected hole 360a and may roll on the bracket 360 according to the rotational operation of the universal cradle 32. The elastic member 364 provides the force for pushing the ball 362 toward the bracket 360, so that the ball 362 is provided with the force for coupling to the hole 360a, which provides the force for maintain the closed state or the open state of the universal cradle 32.

Reference numeral 363 indicates an elastic piece, which provides the force for returning the connector dummy 33 to an initial position.

Figure 15:
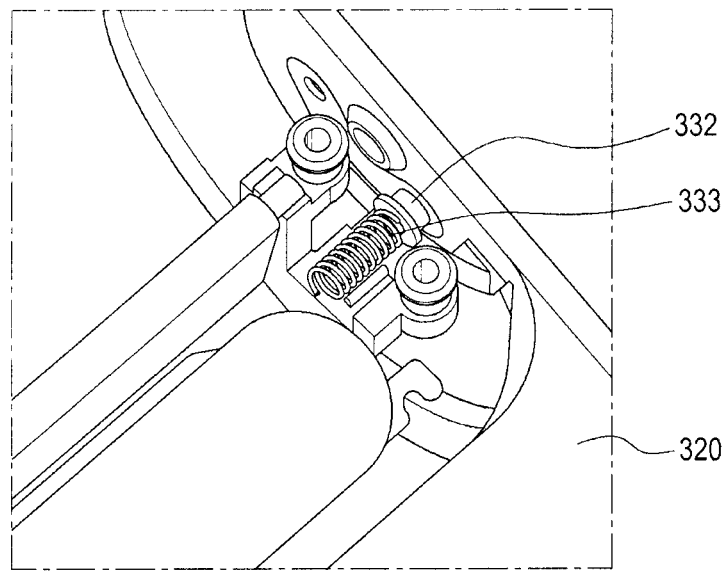
FIG. 15 is a perspective view of the universal dock with a ball mounted according to the second embodiment of the present invention.

FIG. 15 shows the mounting of the elastic piece and the ball.

Figure 16:
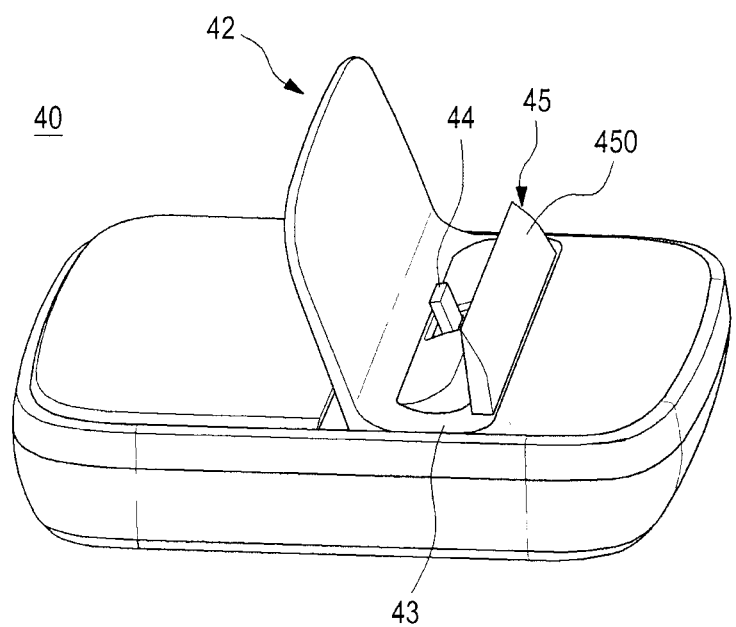
FIG. 16 is a perspective view of the universal dock according to the third embodiment of the present invention.

FIG. 16 is a perspective view of a universal dock 40 according to a third embodiment of the present invention. When comparing the universal dock 40 shown in FIG. 16 to the universal dock 30 shown in FIGS. 8 and 9 in accordance with the second embodiment, the former has a guide 45, and thus the former is different from the latter. However, the remaining configuration of the universal dock 40 is the same as that of the universal dock 30, and thus the details related to the remaining configuration will be omitted. The guide 45 serves to facilitate the operation connecting the portable phone to the connector 44 included in a cradle 42. The guide 45 is configured to protrude from a base 43 of the cradle 42 approximately upward in a vertical direction with a predetermined height. In operation of connecting the portable phone to the connector 44 after cradling it into the cradle 42, the guide 45 guides the connecting operation of the portable phone.

Also, since the guide 45 is included in the cradle 42 to thereby rotate together, an outer surface 450 is configured to have a curvature. In a state that the cradle 42 is closed, the guide 45 is concealed.

As described herein above, the present invention allows all of the portable phones to be charged and/or cradled, so that the economical benefits are attained from the viewpoint of the user or the manufacturer. Particularly, the present invention facilitates the connection of the connector to the portable phone including an accessory, such as an exterior case. Further, the present invention attains the advantage in that the cradle can protect the connector from the external environment. Furthermore, the connector of the present invention is configured to be detachable, so that it can be adapted to the connection of various portable phones. Also, the connector is configured as a universal connector to thereby allow all of the portable phones to be cradled therein and connected thereto.

What is claimed is:

1. A universal dock for a portable terminal, comprising:
   a universal cradle adopted to cradle a portable terminal having various sizes and types or an accessory thereon;
   a connector dummy comprising:
      a connector base installed to the base to be rotatable by a hinge unit; and
      a housing coupled to the connector base to be movable on the connector base in upward and downward directions, the connector dummy being disposed within the universal cradle on a horizontal orientation and providing upward and downward movements; and
   a connector received within the connector dummy adopted to electrically couple to the portable terminal,
   wherein upward and downward movements of the connector dummy adjust a height by which the connector protrudes from the connector dummy,
   wherein the connector dummy is pressed downward as the portable terminal is mounted thereon which in turn causes the connector to protrude more outwardly,
   wherein the connector and the connector dummy are configured to be rotatable in relation to a base of the universal cradle.

2. The universal dock as claimed in claim 1, wherein the connector is fixed to the connector base, and wherein the exposure state of the connector to the exterior changes depending on the movement of the housing.

3. The universal dock as claimed in claim 1, wherein the housing is supported by one or more of first elastic pieces, which are uprightly mounted to the connector base.

4. The universal as claimed in claim 1, wherein the universal cradle comprises:
   a desktop-type base;
   a pair of connecting arms extending from a rear end of the base toward a front end at a predetermined angle; and,
   a support coupled between the connecting arms to maintain a slanted state of the portable terminal.

5. The universal dock as claimed in claim 1, further comprising a balancing member for balancing right-left sides of the housing in upward and downward movements thereof while coupling the connector to the portable terminal.

6. The universal dock as claimed in claim 5, wherein the balancing member is fixed on the connector base to extend along a longitudinal direction of the housing/connector base between the connector base and the housing.

7. The universal dock as claimed in claim 6, wherein the balancing member is a rod made of metallic material, and wherein the balancing member is manufactured by a multiple bending in a direction to make both ends adjacent to each other.

8. The universal dock as claimed in claim 7, wherein the balancing member has a symmetrical shape, wherein the balancing member is symmetrically disposed on the connector base, and wherein a direction for disposing the balancing member is parallel to a direction of a rotational axis of the connector dummy.

9. The universal dock as claimed in claim 1, wherein the connector dummy is provided with a force returning to an initial position by a second elastic member after the rotation of the connector dummy.

\* \* \* \* \*

UNITED STATES PATENT AND TRADEMARK OFFICE
CERTIFICATE OF CORRECTION

PATENT NO. : 9,318,906 B2  
APPLICATION NO. : 13/771954  
DATED : April 19, 2016  
INVENTOR(S) : Jong-Hae Kim Page 1 of 1

It is certified that error appears in the above-identified patent and that said Letters Patent is hereby corrected as shown below:

In the Claims

Column 9, Claim 4, Line 4 should read as follows:
--...The universal dock as...--

Signed and Sealed this  
Seventh Day of June, 2016

Michelle K. Lee  
*Director of the United States Patent and Trademark Office*